(12) United States Patent
Jaeger

(10) Patent No.: US 7,794,329 B2
(45) Date of Patent: Sep. 14, 2010

(54) TORQUE OVERLOAD CLUTCH

(75) Inventor: Daryl J. Jaeger, Kewaskum, WI (US)

(73) Assignee: Weasler Engineering, Inc., West Bend, WI (US)

( * ) Notice: Subject to any disclaimer, the term of this patent is extended or adjusted under 35 U.S.C. 154(b) by 567 days.

(21) Appl. No.: 11/579,161

(22) PCT Filed: Apr. 28, 2005

(86) PCT No.: PCT/US2005/014754

§ 371 (c)(1),
(2), (4) Date: Nov. 20, 2007

(87) PCT Pub. No.: WO2005/108810

PCT Pub. Date: Nov. 17, 2005

(65) Prior Publication Data

US 2008/0214313 A1    Sep. 4, 2008

Related U.S. Application Data

(60) Provisional application No. 60/567,701, filed on May 3, 2004.

(51) Int. Cl.
*F16D 7/06* (2006.01)
(52) U.S. Cl. ......................................................... 464/36
(58) Field of Classification Search .................. 464/36, 464/38, 39; 192/46
See application file for complete search history.

(56) References Cited

U.S. PATENT DOCUMENTS

| | | | | |
|---|---|---|---|---|
| 1,126,219 A | * | 1/1915 | Hupp | ........................... 464/38 |
| 2,493,232 A | * | 1/1950 | Dodge | ....................... 464/36 X |
| 6,346,049 B1 | | 2/2002 | Edi | |
| 6,447,397 B1 | | 9/2002 | Jaeger et al. | |
| 6,666,283 B2 | | 12/2003 | Frauhammer | |
| 2005/0103592 A1 | | 5/2005 | Kampf | |

FOREIGN PATENT DOCUMENTS

| | | | |
|---|---|---|---|
| EP | 1197671 A1 | 4/2002 | |
| FR | 2860848 A1 | 4/2005 | |
| SE | 181986 | * 12/1962 | .................. 464/38 |
| SU | 497429 | * 12/1975 | .................. 464/36 |
| SU | 737-682 | 6/1980 | |

OTHER PUBLICATIONS

European Patent Office—Supplementary European Search Report for corresponding European patent application; dated Apr. 19, 2007.
International Search Report and Written Opinion corresponding to PCT/US2005/014754 under date of mailing of Nov. 18, 2005.
International Preliminary Report on Patentability under date of issuance Nov. 7, 2006.

* cited by examiner

*Primary Examiner*—Greg Binda
(74) *Attorney, Agent, or Firm*—Quarles & Brady LLP

(57) ABSTRACT

A radial detent torque overload clutch has a retaining ring inside the outer housing to retain the hub in the housing and a thrust bearing between the ring and pawls to bear thrust loads that tend to pull the hub out of the housing. The pawls exert driving torque in only one direction so that the hub can be turned manually relative to the housing in the opposite direction by the pawls camming on gently sloped surfaces of the housing.

14 Claims, 3 Drawing Sheets

TORQUE OVERLOAD CLUTCH

CROSS-REFERENCE TO RELATED APPLICATION

This claims the benefit of U.S. Provisional Patent Application No. 60/567,701 filed May 3, 2004.

STATEMENT CONCERNING FEDERALLY SPONSORED RESEARCH OR DEVELOPMENT

Not applicable.

FIELD OF THE INVENTION

This invention relates to torque overload clutches, in particular to such clutches for machine drive lines or drive trains.

BACKGROUND OF THE INVENTION

U.S. Pat. No. 6,447,397 discloses a radial detent torque overload clutch primarily suited for a drive line. The clutch has an outer member and an inner member, and three detents between the inner member and the outer member that maintain the members in rotational driving engagement with one another below a certain overload torque between them. Each detent includes a driving member that slides radially in an opening in the inner member between an engaged position in which the driving member is seated in a recess of the outer member in driving engagement with the recess and a disengaged position in which the driving member is retracted from the recess and the outer member is continuously rotatable relative to the inner member. The driving members are moved radially outward to engage in the recesses by a mechanism including a disc spring that exerts an axial spring force that biases the driving members into the engaged position, and the disc spring is regressive so that the spring force it exerts is less in the disengaged position than it is in the engaged position. The disclosure of U.S. Pat. No. 6,447,397 is hereby incorporated by reference for the teaching of the detents in FIGS. 2-6 and operation in col. 4, line 12—col. 5 line 36, as if fully set forth herein.

The design of U.S. Pat. No. 6,447,397 is a relatively large diameter mechanism, which is acceptable in many applications. It was a large diameter in part because of the mechanism that permitted it to be free running for a limited angle so as to permit aligning the splines of the hub with the splines of the shaft to which it is to be connected. However, some applications require a more compact design.

SUMMARY OF THE INVENTION

The invention provides a radial detent torque overload clutch that can be made with less material, with good durability, in a smaller size and with fewer separate parts.

In one form, a radial detent torque overload clutch of the invention has a retaining ring inside the outer housing to retain the hub and pawls axially in the housing. This results in constructional changes that permit the above described advantages.

Preferably, a thrust bearing is provided between the ring and pawls to bear thrust loads against an axially facing surface of the inner member that tend to pull the hub out of the housing. This helps protect the springs from excessive thrust loads as the thrust bearing will bear them to improve durability of the clutch.

In another aspect, the pawls exert driving torque in only one direction. In the other direction, the hub can be turned manually relative to the housing by the pawls camming on gently sloped surfaces of the housing. When a pawl reaches one of the driving engagement surfaces when sliding in this direction, the pawl overruns it and keeps going, producing a chattering sound to let the operator know that the clutch is overrunning in the opposite direction. This lets an operator align the clutch with splines on a shaft when installing the clutch to a drive or driven shaft, and also permits the clutch to overrun for example if the power take-off shaft of a tractor is stopped quickly.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
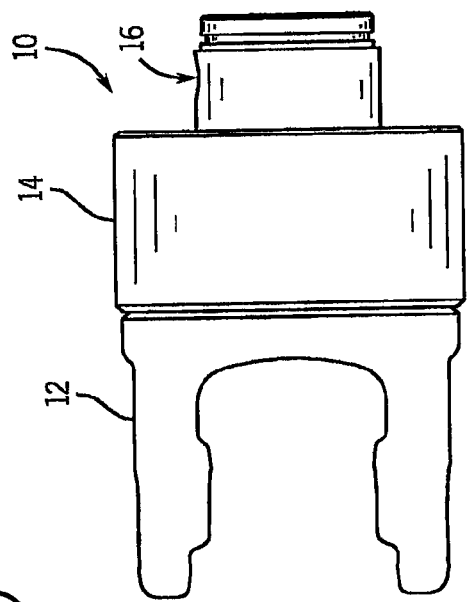
FIG. 1 is a side plan view of a coupler employing a preferred embodiment of a torque limiting clutch of the present invention.
Figure 3:
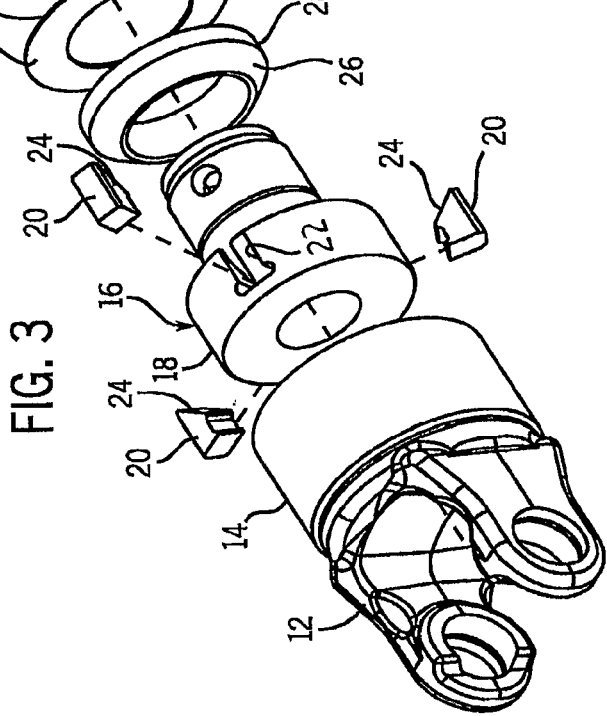
FIG. 3 is an exploded assembly view of the coupler.
Figure 2:
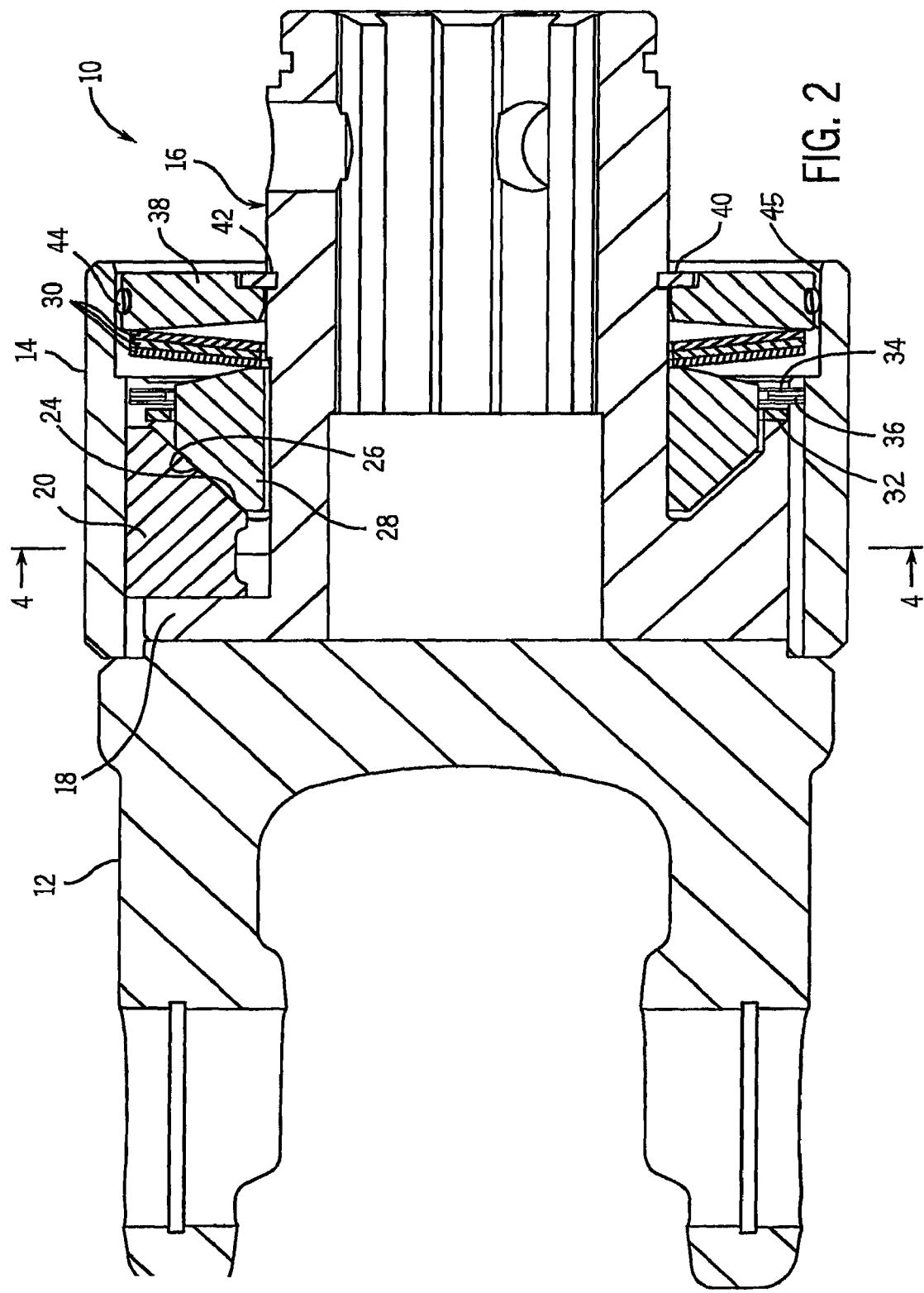
FIG. 2 is a sectional view of the coupler illustrated in FIG. 1 as viewed from a radial plane in the engaged position.

Referring to FIGS. 1-3, a torque overload clutch 10 of the invention has a yoke 12 fixed, for example by welding, to an outer housing 14. An inner hub 16 that is rotatable relative to the yoke and housing has its inner end 18 contained within the housing 14 and its outer end is internally splined to receive a splined shaft. Detents are provided by each of three pawls 20 received in a corresponding radially extending slot 22 in the inner end 18, each of which is radially slidable therein to normally transmit torque between the hub 16 and housing 14 in one direction, but permit overrunning (relative rotation) if the torque capacity of the clutch is exceeded or if torque is transmitted in the opposite direction. The slots 22 are open at their rear ends.

Each pawl 20 is a driving member that has a ramped surface 24 that cams on a mating ramped surface 26 of an actuator ring 28. The actuator ring 28 is biased axially toward the pawls 20 by a spring made up of three disc springs 30, that has a regressive spring rate as described in U.S. Pat. No. 6,447,397. A ring shaped thrust bearing 32 is positioned inside the housing 14, outside of the actuator ring 28 and between the outer ends of the pawls 20 and the axially inner side of a split retainer ring 34 that is snapped into an internal groove 36 in the housing 14. The thrust bearing bears on the adjacent axially facing surface of end 18 on its left side as viewed in FIG. 2, and on the ring 34 on its right side if the inner member 16 is attempted to be pulled out of the outer member 14. The retainer 34 captures the end 18 and the pawls 20 inside of the housing 14 and reacts against any excessive thrust loads the hub 16 exerts on the housing 14, that tend to pull the hub 16 axially out of the housing 14. This helps protect the springs 30 from being subjected to excessive thrust loads.

The inner radius edges of the springs 30 react against the actuator ring 28, and the outer radius edges of the springs 30 react against a compression plate 38, or keeper 38, that is held axially on the hub 16 by a split retainer ring 40 that is snapped into an external groove 42 in the hub 16. An o-ring 44 seals the outer circumference of the compression plate 38 against the bore 45 in the end of the housing 14.

Figure 4:
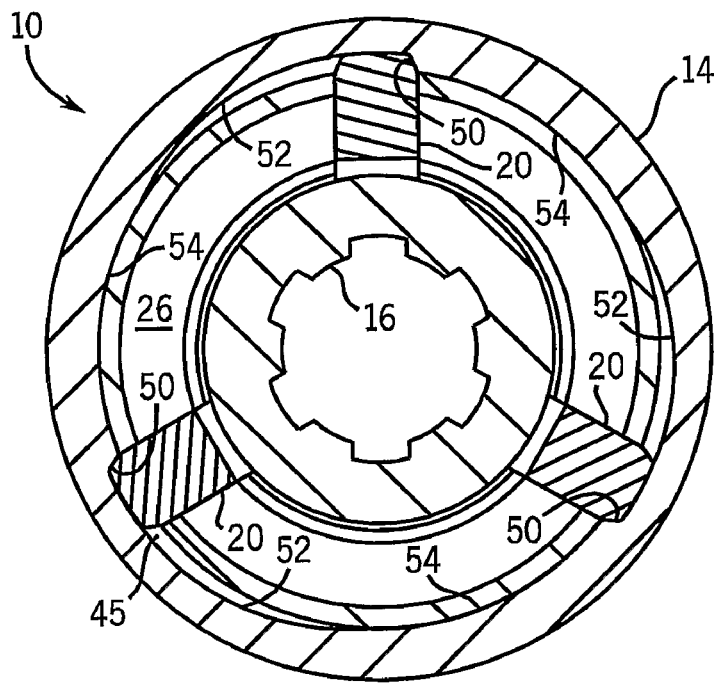
FIG. 4 is a sectional view from the plane of the line 4-4 of FIG. 2 of the clutch in an engaged position.

Referring to FIG. 4, the pawls 20 are illustrated in their most radially outward, fully engaged positions. In this position, each pawl 20 has a steeply ramped outer corner that is engaged with a mating steeply ramped surface 50 formed in the interior surface of the housing 14. If a torque is exerted on the hub 16 to drive the yoke 12 in the clockwise direction as viewed in FIG. 4, the torque is exerted from the hub 16, through the pawls 20 bearing on the surfaces 50 to the housing 14 and therefore, since the housing is fixed to the yoke 12, to the yoke 12. If the torque capacity of the clutch 10 is exceeded, the pawls 20 cam on the surfaces 50 and are pushed radially inwardly. In doing so, the pawls 20 cam on the ramped surface 26 of the ring 28, which urges the ring 28 axially away from the pawls 20 against the bias of the disc springs 30, permitting relative rotation of the hub 16 and housing 14 when the pawls 20 disengage from the surfaces 50. Each time a pawl 20 passes a surface 50 as the hub 16 and housing 14 relatively rotate, it attempts to re-engage, producing a chattering noise. When the torque subsides to below the capacity, the re-engagement attempts are successful, arresting relative rotation between the hub 16 and housing 14, to once again transmit torque from the hub 16 to the housing 14.

Figure 5:
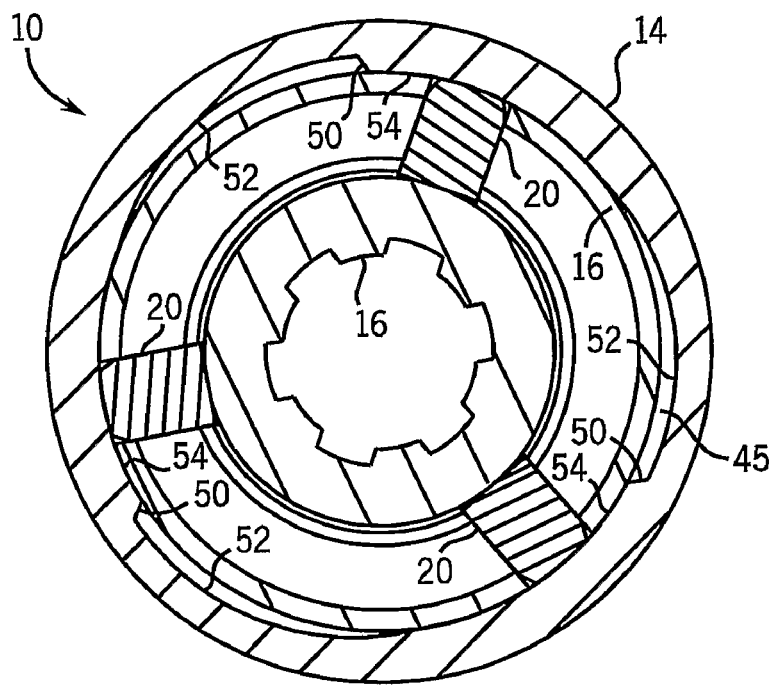
FIG. 5 is a view like FIG. 4, but with the clutch in a disengaged position.

Significant torque is only transmissible in one rotary direction in the clutch 10. That is the rotary direction in which the pawls 20 approach the surfaces 50 to abut them. Torque may be transmitted from the hub 16 to the housing 14 in this direction, or from the housing 14 to the hub 16. In the opposite direction, like if the hub 16 were turned counter-clockwise as viewed in FIG. 4 relative to the housing 14, each pawl can slide on a surface 52 that slopes gently radially inwardly to the diameter of the inside diameter surfaces 54 of the cam race surface in the bore 45 of the housing 14, as illustrated in FIG. 5, so that they are in the fully disengaged position on the surfaces 54. The slope is gentle, meaning that it is such that a manual force can be exerted to turn the housing 14 and hub 16 relatively in this direction. As illustrated, in the preferred embodiment, the surface ramps inwardly for somewhat more than 45°, whereas the surfaces 50 traverse the same radial distance in very few degrees. This permits the hub 16 to be turned relative to the housing 14 in this direction (moving the pawls 20 away from the surfaces 50) with the application of a relatively low torque, in comparison to the torque capacity in the driving direction. This allows overrunning of the housing 14 relative to the hub 16 in the reverse direction so that if there is a large downstream inertia and the power take off shaft of the tractor driving the clutch slows down quickly when it is turned off, like if there is an automatic brake on it, the driven mass, which may have too large of an inertia to be stopped immediately, can keep on turning until the inertia subsides. Also, for smaller capacity clutches, if the force exerted by the springs 30 is sufficiently small, the friction force between the ends of the pawls 20 and the inside of the housing 14 will be small enough to permit manual turning of the hub 16 relative to the housing 14 so as to allow a user to align the splines of the hub 16 with the splines of a shaft to which it is to be connected.

These features permit a clutch of a significantly smaller size, for example approximately 4" in diameter versus approximately 7". They also simplify and reduce the cost of manufacture, and produce a longer life of the clutch by isolating the springs from excessive thrust loads.

In addition, a clutch so constructed could have something other than a yoke 12 secured to the housing 14. For example, the yoke 12 could be replaced with a sprocket for a chain drive application, or a gear for a gear drive application, and the sprocket or gear could have a hole through the center that would allow a shaft to be inserted through it, so the shaft could be inserted through the clutch and the sprocket or gear.

A preferred embodiment of the invention has been described in considerable detail. Many modifications and variations to the preferred embodiment described will be apparent to a person of ordinary skill in the art. Therefore, the invention should not be limited to the embodiment described.

I claim:

1. In a torque overload clutch having an outer member and an inner member radially inward of said outer member, and at least one detent between said inner member and said outer member which maintains said members in rotational driving engagement with one another below a certain overload torque between said members, each said detent including a driving member that slides radially in an opening in said inner member between an engaged position in which said driving member is seated in a recess of said outer member in driving engagement with said recess and a disengaged position in which said driving member is retracted from said recess and said outer member is continuously rotatable relative to said inner member, said driving member being moved radially outward to engage in said recess by a mechanism including a spring that exerts an axial spring force that biases said driving member into said engaged position, the improvement wherein:

said driving member and said inner member are axially captured in the outer member by a ring that fits in a groove around a bore of the outer member, so as to limit compression of the spring by thrust loads placed on the inner member.

2. The apparatus as recited in claim 1, wherein said inner member is splined for engagement with a shaft.

3. The apparatus as recited in claim 1, further comprising a thrust bearing between said ring and said driving member.

4. The apparatus as recited in claim 3, wherein the thrust bearing bears against an axially facing surface of the inner member.

5. The apparatus as recited in claim 1, wherein said mechanism includes an actuator ring axially between said driving member and said spring, and said spring biases said actuator ring so as to cam said driving member on said actuator ring radially outwardly.

6. The apparatus as recited in claim 1, wherein said spring is retained axially by a keeper, and said keeper is retained axially relative to the inner member by a ring that fits in a groove in an outer surface of the inner member.

7. In a torque overload clutch having an outer member and an inner member radially inward of said outer member, and at least one detent between said inner member and said outer member which maintains said members in rotational driving engagement with one another below a certain overload torque between said members, each said detent including a driving member that slides radially in an opening in said inner member between an engaged position in which said driving member is seated in a recess of said outer member in driving engagement with said recess and a disengaged position in which said driving member is retracted from said recess and said outer member is continuously rotatable relative to said inner member, said driving member being moved radially outward to engage in said recess by a mechanism including a spring that exerts an axial spring force that biases said driving member into said engaged position, the improvement wherein:

said driving member is seated in said recess in driving engagement with the outer member in one rotary direction of driving torque transmission so that the outer member and inner member can be turned relative to one another only above said certain overload torque, and so that in an opposite relative rotary direction the outer member and inner member can be turned relative to one another with a lower torque than said certain overload torque.

8. The apparatus as recited in claim 7, wherein in the opposite relative rotary direction the driving member slides on a surface of the outer housing that is more gently sloped than a surface of the outer housing that the driving member slides on in the one rotary direction.

9. In a torque overload clutch having an outer member and an inner member radially inward of said outer member, and at least one detent between said inner member and said outer member which maintains said members in rotational driving engagement with one another below a certain overload torque between said members, each said detent including a driving member that slides radially in an opening in said inner member between an engaged position in which said driving member is seated in a recess of said outer member in driving engagement with said recess and a disengaged position in which said driving member is retracted from said recess and said outer member is continuously rotatable relative to said inner member, said driving member being moved radially outward to engage in said recess by a mechanism including a spring that exerts an axial spring force that biases said driving member into said engaged position, the improvement wherein:

said driving member and said inner member are axially captured in the outer member by a ring that fits in a groove around a bore of the outer member, so as to limit compression of the spring by thrust loads placed on the inner member; and each driving member is seated in an associated recess in driving engagement for only one rotary direction of driving torque transmission, so that in the opposite rotary direction the outer member and inner member can be turned relative to one another with a lower torque than in the one rotary direction.

10. The apparatus as recited in claim 9, wherein said inner member is splined for engagement with a shaft.

11. The apparatus as recited in claim 9, further comprising a thrust bearing between said ring and said driving member.

12. The apparatus as recited in claim 11, wherein the thrust bearing bears against an axially facing surface of the inner member.

13. The apparatus as recited in claim 9, wherein said mechanism includes an actuator ring axially between said driving member and said spring, and said spring biases said actuator ring so as to cam said driving member on said actuator ring radially outwardly.

14. The apparatus as recited in claim 9, wherein said spring is retained axially by a keeper, and said keeper is retained axially relative to the inner member by a ring that fits in a groove in an outer surface of the inner member.

* * * * *